United States Patent [19]

Pedersen

[11] 3,978,243

[45] Aug. 31, 1976

[54] PROCESS FOR PREPARING GELLED SOUR MILK

[75] Inventor: Jens Kristian Pedersen, Albertslund, Denmark

[73] Assignee: Kobenhavns Pektinfabrik, Copenhagen, Denmark

[22] Filed: Jan. 30, 1975

[21] Appl. No.: 545,656

[30] Foreign Application Priority Data
Feb. 5, 1974 United Kingdom............... 5335/74

[52] U.S. Cl................................. 426/573; 426/575; 426/577; 426/583
[51] Int. Cl.²......................................... A23L 1/04
[58] Field of Search ............ 426/576, 577, 583, 573

[56] References Cited
UNITED STATES PATENTS

| | | | |
|---|---|---|---|
| 2,853,386 | 9/1958 | Hughes | 426/577 |
| 3,355,298 | 11/1967 | Loter | 426/583 |
| 3,563,769 | 2/1971 | Horn | 426/577 |
| 3,625,702 | 12/1971 | Exler | 426/583 |
| 3,917,875 | 11/1975 | Gardiner | 426/573 |

FOREIGN PATENTS OR APPLICATIONS 1,072,768  6/1967  United Kingdom................ 426/576

Primary Examiner—Jeanette M. Hunter
Attorney, Agent, or Firm—William S. Alexander

[57] ABSTRACT

Sour milk, either chemically or biologically soured, is gelled by the use of electronegative gelling agents when a stabilizer such as a high methoxyl pectin, carboxymethyl cellulose or propylene glycol alginate is added to the milk prior to addition of the gelling agent. The presence of the stabilizer also permits the product to be pasteurized prior to gelling.

7 Claims, No Drawings

PROCESS FOR PREPARING GELLED SOUR MILK

The present invention relates to a method of preparing a gelled sour milk product by adding a gelling agent to a stabilized sour milk product.

The addition of an acid to milk as, e.g., in the production of yogurt or flavored sour milk drinks, ordinarily results in the curdling of the milk when the pH value falls below the isoelectric point of the casein in the milk at about pH 4.6. This curdling can be prevented by the addition of a stabilizer such as high methoxyl pectin (see Netherlands patent application No. 171,194), carboxymethylcellulose or propylene glycol alginate. These stabilizers also prevent curdling of the acidified (sour) milk product during a subsequent heat treatment as might be carried out to effect pasteurization.

Biologically soured milk — also referred to as cultured sour milk — can also be stabilized by the use of these same stabilizers (see, e.g., U.S. Pat. No. 3,625,702).

It is also well known that gelled milk products can be prepared from fresh milk by adding thereto a gelling agent such as carrageenan, low methoxyl pectin, or furcellaran. These gelling agents, however, are electronegatively charged and consequently they react with casein below its isoelectric pH (~4.6) at which casein carries a net positive charge. Thus, the electronegatively charged gelling agents do not form gels with sour milk but rather form undesirable coprecipitates with casein.

Agar and gelatin have heretofore been used instead of the electronegatively charged gelling agents in preparing a gelled sour milk product. Neither of these has been entirely satisfactory.

Agar, which is electroneutral, produces a hard gel which is organoleptically unacceptable, whereas the consistency of gels produced with gelatin is too sensitive to temperature variations. Thus, if a sour milk product is gelled with gelatin, it is possible to produce a gel having an acceptable consistency at 5°C. but this gel becomes soft at room temperature. If the concentration of gelatin is increased to produce a gel which is acceptable at room temperature, such a gel will be excessively firm and unpalatable at refrigerator temperature.

The main object of this invention is to provide a gelled sour milk product having an acceptable consistency which is relatively insensitive to temperature variations. A further object of the invention is to provide a gelled sour milk product prepared from sour milk and an electronegatively charged gelling agent. A still further object of the invention is to provide a gelled sour milk product which can be pasteurized to obtain a long shelf life.

Surprisingly, it has now been found that if sour milk is stabilized with a stabilizer of the type mentioned above, it can be gelled with electronegatively charged gelling agents. The coprecipitation with casein does not take place. Moreover, the gelled sour milk thus obtained has a consistency which varies only slightly within the temperature range between 0° and 30°C.

The invention is a method of preparing a gelled sour milk product which comprises stabilizing sour milk with a stabilizer selected from the group consisting of high methoxyl pectin, carboxymethyl cellulose and propylene glycol alginate and gelling said stabilized sour milk by adding thereto a gelling agent selected from the group consisting of low methoxyl pectin, carrageenan, and furcellaran.

For the purpose of this invention, the term "high methoxyl pectin" means a methyl ester of pectic acid having a degree of methylation (DM) of about 50% or more. Low methoxyl pectins are those having DM of less than 50.

Carboxymethyl cellulose is a water-soluble cellulose ether containing at least about 0.4 and preferably about 0.4 to 1.2 carboxymethyl groups per anhydroglucose unit. As used herein, the term refers to the alkali metal salt and preferably the sodium salt in which substantially all carboxyl groups are neutralized.

The stabilizer can be present in the amount of about 0.1 to about 5%, preferably about 0.5 to 1% based on the weight of the milk being treated. Higher concentrations than 5% can be used, but no additional stabilizing effect is obtained and it is thus not economically feasible to use higher concentrations.

The gelling agents, as stated above, are electronegatively charged polysaccharide-type materials which are reactive with calcium or potassium ion present in the milk. Not all electronegative gelling agents are satisfactory, however, since other such materials are frequently too reactive with calcium and thus gel too quickly or they form gels that are too hard. Low methoxyl pectin, furcelleran and carrageenan have been found to be very effective, both as to their rate of gelling and consistency of the resultant gels. Additionally, these are all commercially available, economically attractive materials.

The preferred gelling agent is low methoxyl pectin. This material has hereinabove been defined as pectin having a degree of esterification less than 50%. Low methoxyl pectin is prepared by demethylation of the naturally occurring high methoxyl pectin. This is accomplished either by acid catalyzed hydrolysis with nitric or hydrochloric acid or by base catalyzed hydrolysis with ammonia. When ammonia is used, the product becomes partially amidated, but this has no bearing on its performance as a gelling agent in the method of this invention.

When carrageenan is the gelling agent, either of the conventional carrageenans, i.e., the kappa- or iota-configuration can be used. Mixtures of the kappa- and iota- configuration materials can also be used. In addition, a mixture of one or both carrageenans with up to about 50% locust bean gum is a very effective gelling agent.

In order to obtain a satisfactorily gelled product, the gelling agent concentration is preferably between about 0.2 and 2% based on the total weight of the gelled composition. Below 0.2%, the resultant gel is not sufficiently stiff for most purposes. Above 2%, it becomes too stiff. The optimum concentration is about 0.5% to 1%.

The efficacy of the stabilizer can be improved by adding to the milk, either with the stabilizer or at about the same time, an alkali metal salt of citric or phosphoric acid. These materials complex the calcium in the milk and control the pH of the system. This reduces the possibility of coagulation during the acid addition. Normally, the salt, if used, will be in a concentration of less than about 0.5%, based on the weight of the total system.

The stabilizer is added to the milk at a temperature below about 30°C. and preferably below about 5°C. In most cases, it is added as a solution in water and with the pH adjusted to be as close as possible to that of milk. For adjusting the pH, the alkali metal citrate and phosphates mentioned above are useful. The stabilizer can also be added to the milk in dry form if the recipe does not provide for addition of water. In this latter case, the stabilizer is preferably dry mixed with an inert agent such as sugar to prevent formation of lumps when it is added to the milk.

The sour milk to which the method of this invention is applicable can be biologically soured (cultured) as by treating with, e.g., a culture of *Streptococcus cremoris* or *Streptococcus lactis*. More normally, however, the souring will be accomplished by adding to the milk an organic acid such as, e.g., lactic acid or a constituent of a fruit juice such as citric acid. This is very commonly done in the preparation of fruit flavored sour milk products such as fruit flavored yogurt.

In preparing a fruit flavored sour milk product from fresh milk, it is good practice to add the milk containing added stabilizers to the fruit juice. This order of addition causes an immediate decrease of the casein pH from 6.5 to below 4.6. If circumstances dictate adding the juice to the milk, blending should be accomplished as quickly as possible so that the system is not held any longer than necessary at the casein isoelectric point (pH 4.6) as this is the point of minimum stability where precipitation of the casein is most likely.

Stabilization is best at pH 3.8 to 4.2. As pH approaches 4.6, the viscosity of the stabilized product increases. Viscosity increase is a process disadvantage by itself as well as an indication of inferior stability. The stabilizing effect of the stabilizer also decreases as the pH drops below 3.8.

The same considerations as to temperature, means of addition and pH apply when the stabilizer is being added to a cultured sour milk product as when fresh milk is being used.

The gelling agent is preferably predissolved in water prior to adding the same to the milk. Low methoxyl pectin, in particular, having a high affinity for calcium ion, is difficult to dissolve in milk directly. Here again, the presence of a small amount of alkali metal citrate or phosphate is helpful in complexing calcium ion and facilitating the dissolution of the pectin. Carrageenan and furcellaran are also incorporated more easily if they are predissolved in water. These latter gelling agents, however, are much less reactive with calcium and can be incorporated without being predissolved if circumstances so require.

Although, as pointed out above, the best stabilization results are achieved around pH 4, it is sometimes easier to incorporate a negatively charged gelling agent at pH about 4.4. This is readily accomplished by buffering the gelling agent prior to adding the same to the milk.

The gelling agent is preferably added as a solution in warm water (50°–80°C.) to the stabilized sour milk product which is preheated to a temperature in the range 50°–80°C. to avoid gelation as the two components are mixed. Gelling takes place on cooling.

To extend the shelf life of the gelled sour milk product, the sour milk product with the gelling agent added thereto can be heated to pasteurization temperature, i.e., about 70° to 90°C. for 5 to 30 minutes. The pasteurized product at pasteurization temperature is poured into containers or it can be cooled to a lower temperature above the gelling temperature before being charged into said containers.

The invention will now be described in further detail with reference to the following examples. Parts and percentages are by weight unless otherwise specified.

EXAMPLE 1

Three parts of caboxymethyl cellulose (CMC7MF -Hercules Incorporated) and 2 parts of dipotassium orthophosphate ($K_2HPO_4$) were dissolved in 80 parts of water. This solution was cooled to a temperature of 5°–10°C. and added to 535 parts of mil at 5°–10°C.

To this solution was added, with stirring, 80 parts of orange concentrate in which 2 parts of citric acid had been dissolved to produce 702 parts of stabilized orange juice/milk drink.

Six parts of a carrageenan/locust bean gum blend (GENUGEL LC 1 - A/S Kobenhavns Pectinfabrik) was dissolved in 292 parts of water in a high speed mixer at 90°C. This solution was cooled to 70°C. and added to the 702 parts of juice/milk drink heated to 70°C.

The product was filled into containers at 70°C. and subsequently cooled to refrigerator temperature (5°C.)

The resulting gelled product had a pH of 4.60.

EXAMPLE 2

Four parts of high methoxyl pectin (GENU pectin type JM - A/S Kobenhavns Pectinfabrik) was mixed with 33 parts by weight of dextrose and 33 parts by weight of sucrose. This mixture was added to 660 parts by weight of yogurt (pH ~4.25). After about 10 minutes this mixture was homogenized at 150 atmospheres. It was then heated to 50°C. and homogenized again at 350 atmospheres.

Three parts of disodium dihydrogen pyrophosphate ($Na_2H_2P_2O_7$) and 10 parts of low methoxyl pectin (GENU pectin type 21 AB - A/S Kobenhavns Pectinfabrik) were dissolved in 255 parts by weight of water at 80°C. using a high speed mixer. This solution was added to the stabilized yogurt and thoroughly mixed therewith. The product was filled into containers 65°C. and subsequently cooled to 5°C.

The resulting gelled yogurt had a pH of 4.25, a smooth consistency and a pleasant taste.

EXAMPLE 3

About 0.45 part of high methoxyl pectin and 0.2 part of sodium citrate dihydrate were mixed and dissolved in 9 parts of water at a temperature of about 50°C. The solution thus produced was cooled to below 20°C.

Forty-five parts of milk was mixed with 5 parts of sugar at 0°–20°C. to dissolve the sugar in the milk. Subsequently, the two solutions produced were mixed and the mixture was added to 40.35 parts of orange juice at a temperature of 0°–20°C. so as to produce 100 parts of a stabilized mixture of orange juice and milk.

One part of low methoxyl pectin was dissolved in 33 parts of water at a temperature of 80°–90°C. using a high speed mixer. The solution thus prepared was added to 66 parts of a stabilized mixture of orange juice and milk prepared at 70°C. as described in Example 1.

The product thus prepared was filled into containers while at a temperature of 70°C. and subsequently cooled to 5°C. to form a gel.

Similarly, gelled orange juice/milk products were made by blending 66 parts of the stabilized mixture of orange juice and milk with a. a solution of gelatin in water prepared by dissolving 2 parts of a gelatin (220 g. Bloom) in 32 parts of water at 70°C.

b. a solution of gelatin in water prepared by dissolving 1.5 parts of gelatin (220 g. Bloom) in 32.5 parts of water at 70°C.

c. a solution of agar in water prepared by dissolving 0.4 parts of agar in 33.6 parts of water by boiling for 2 minutes.

Gelled orange juice/milk products prepared as above were stored overnight at three temperatures: +5°C., +20°C., and +30°C. The breaking strength of the gelled products was then measured on an Instron Universal testing machine using a cylindrical plunger 21 mm. in diameter traveling at 5 cm/min. into the gel.

The breaking strengths, measured as the force in grams required to break the gel, of the orange juice/milk gels prepared with the different gelling agents are recorded in the following table.

resulting solution was added to 540 parts by weight of milk at 10°C.

A citric acid solution was added to reduce the pH of the milk to 4.2. Ten parts by weight of low methoxyl pectin (GENU LM pectin type 21 AB) was dissolved in 320 parts by weight of water at 80°C. in a high speed mixer. The low methoxyl pectin solution was added to the chemically acidified milk at 70°C. The product was filled into containers and subsequently cooled to 5°C.

The resulting product had a light gelled consistency and a homogeneous appearance. The pH of the product was 4.3.

EXAMPLE 6

Three parts of high methoxyl pectin was dissolved in 80 parts of water in a high speed mixer. This solution

| Gelling Agent | | Breaking Strength | | |
|---|---|---|---|---|
| Type | Conc. in Gel. | After 16 hrs. at 5°C. | After 16 hrs. at 20°C. | After 16 hrs. at 30°C. |
| LM-pectin | 1.0% | 36 | 22 | 15 |
| Gelatin | 2.0% | 520 | 85 | fluid |
| Gelatin | 1.5% | 196 | almost fluid | fluid |
| Agar | 0.4% | 71 (syneresis) | 56 (syneresis) | 38 (syneresis) |

The gels produced with low methoxyl pectin were soft and smooth at all temperatures.

The gels produced with gelatin were hard and chewy at 5°C., the 2% gel was soft and smooth at 20°C., the 1.5% gel was almost fluid at 20°C., and both products were completely fluid at 30°C.

The gels produced with agar had a soft and brittle consistency at all temperatures. Syneresis was excessive at all temperatures.

Orange juice/milk gels gelled with low methoxyl pectin were stored at 5° and 20°C. for a period of 60 days. At 5°C. the gels were completely unchanged after 60 days; at 20°C. there was no change of the smooth and soft texture, but a small amount of syneresis had occurred. No microbial growth was observed in any of the gelled products at 5° or 20°C.

EXAMPLE 4

Four parts by weight of high methoxyl pectin (GENU pectin type JM - A/S Kobenhavns Pectinfabrik) were mixed with 66 parts of sucrose. This mixture was added to 660 parts by weight of yogurt (temperature 10°C.). After about 10 minutes this mixture was homogenized at 150 atmospheres, then heated to 50°C. and homogenized further at 350 atmospheres.

Twelve parts by weight of low methoxyl pectin (GENU pectin type 21 AB - A/S Kobenhavns Pectinfabrik), 15 parts by weight of a proteinaceous whipping agent and 5 parts by weight of sodium citrate were dissolved in 238 parts by weight of water at 80°C., and the solution was whipped to a light foam using a planetary beater.

The stabilized yogurt was added to the foam in the planetary beater to produce an aerated yogurt dessert with a specific gravity of 0.5–0.6 and a pH of 4.5.

EXAMPLE 5

Six parts by weight of propylene glycol alginate and 2 parts by weight of sodium citrate were added to 120 parts by weight of water in a high speed mixer. The was cooled to 5°–10°C. and added to 535 parts of milk at 5°–10°C.

To this solution were added 80 parts or orange concentrate in which 2.0 parts of citric acid was dissolved to produce 700 parts of stabilized orange juice/milk drink. The drink was heated to 65°C. and homogenized at 150 atmospheres.

Ten parts of low methoxyl pectin was dissolved in 290 parts of water (at 80°C.) in a high speed mixer, and the solution was added to the orange juice/milk drink. The product was filled into containers at 70°C. and subsequently cooled to 5°C.

The resulting product had a soft gelled consistency, a homogeneous appearance and a pleasant taste. Its pH was 4.25.

What I desire to claim and protect by Letters Patent is:

1. A method of preparing a gelled sour milk product having a pH of about 3.8 to 4.6 which comprises stabilizing said sour milk with a stabilizer selected from the group consisting of high methoxyl pectin, carboxymethyl cellulose, and propylene glycol alginate, and gelling said stabilized sour milk by a gelling agent selected from the class consisting of low methoxyl pectin, carrageenan, and furcellaran and thereafter subjecting the mixture to temperature conditions sufficient to effect gelling, said stabilizer being present in amount of about 0.1 to 5% based on the weight of the sour milk, and said gelling agent being about 0.2 to 2% by weight of the entire gelled product.

2. The process of claim 1 wherein the mixture of stabilized sour milk and gelling agent is heated to a temperature within the range of about 30° to 70°C. for up to about 5 minutes, and thereafter cooled to effect gelling.

3. The process of claim 1 wherein the mixture of stabilized sour milk and gelling agent is heated to a temperature and for a time sufficient to effect pasteurization of the milk, and thereafter cooled to effect gelling.

4. The process of claim 1 wherein the sour milk is prepared by contacting fresh milk with an organic acid.

5. A method of preparing a gelled sour milk product which comprises adding to fresh milk about 0.1 to 5% based on the weight thereof of a stabilizer selected from the class consisting of high methoxyl pectin, carboxymethyl cellulose and propylene glycol alginate, contacting the resultant mixture with sufficient organic acid to decrease the pH thereof to about 3.8 to 4.2, adding thereto about 0.2 to 2% by weight based on the total weight of the gelled sour milk product of a gelling agent selected from the class consisting of low methoxyl pectin, carrageenan and furcellaran, said gelling agent being added at a temperature within the range of about 30° to 90°C., maintaining said temperature for up to about 30 minutes, and thereafter cooling to effect gelling.

6. The process of claim 5 wherein the organic acid is a constituent of a fruit juice.

7. The process of claim 5 wherein the temperature is maintained at about 30° to 70°C. for up to about 5 minutes.

* * * * *